United States Patent [19]

Epperson

[11] Patent Number: 5,153,938
[45] Date of Patent: Oct. 13, 1992

[54] ACCELERATION PROTECTION ENSEMBLE AND METHOD

[75] Inventor: William L. Epperson, Alton, Ill.

[73] Assignee: McDonnell Douglas Corporation, St. Louis, Mo.

[21] Appl. No.: 717,383

[22] Filed: Jun. 19, 1991

[51] Int. Cl.$^5$ .................. A41D 13/00; B64D 10/00
[52] U.S. Cl. ............................ 2/2.1 A; 2/69; 2/81
[58] Field of Search ............... 2/2.1 A, 69, 81, 2

[56] References Cited

U.S. PATENT DOCUMENTS

| Re. 22,101 | 5/1942 | Holste | 128/1 |
|---|---|---|---|
| 2,335,474 | 11/1943 | Beall | 128/1 |
| 3,089,482 | 5/1963 | Gray | 128/1 |
| 3,124,123 | 3/1964 | Kops et al. | 128/1 |
| 3,137,290 | 6/1964 | Gongwer | 128/1 |
| 3,660,851 | 5/1972 | Marroni, Jr. | 2/2.1 A |
| 4,230,097 | 10/1980 | Beaussant et al. | 128/1 A |
| 4,243,024 | 1/1981 | Crosbie et al. | 128/1 A |
| 4,455,685 | 6/1984 | Steffler et al. | 2/2.1 A |
| 4,534,338 | 8/1985 | Crosbie et al. | 128/1 A |
| 4,546,491 | 10/1985 | Beaussant | 2/2.1 A |
| 4,583,522 | 4/1986 | Aronne | 2/2.1 A |
| 4,638,791 | 1/1987 | Krogh et al. | 128/1 A |
| 4,674,479 | 6/1987 | Jennings et al. | 2/2.1 A |
| 4,736,731 | 4/1988 | Van Patten | 128/1 A |
| 4,787,576 | 11/1988 | McGrady et al. | 244/122 |
| 4,925,123 | 5/1990 | Wurst et al. | 2/2.1 A |
| 5,003,630 | 4/1991 | Bassick et al. | 2/2.1 A |
| 5,007,893 | 4/1991 | Row | 600/20 |
| 5,027,437 | 7/1991 | Reddemann et al. | 2/2.1 A X |

Primary Examiner—Werner H. Schroeder
Assistant Examiner—Gloria Hale
Attorney, Agent, or Firm—Armstrong, Teasdale, Schlafly & Davis

[57] ABSTRACT

An acceleration protection ensemble protects a person aboard an aircraft from the effects of acceleration. One embodiment comprises a liquid impervious cavity having a flexible interior layer that presses against the body. The cavity substantially covers the person's shins, front thighs, chest and back, and behind the knees, and leaves the buttocks, arms, and rear calves, and thighs substantially uncovered. Hydrostatic pressure within the cavity is restrained by a exterior restraining layer of flexible indistensible material. Substantially all of the cavity is positioned between the body and the restraining layer. The restraining layer substantially covers the buttocks, and rear calves and thighs to provide a pressure panel against body parts not covered by the cavity. The filled cavity hydrostatically presses body parts under it and tensions the pressure panels to press body parts underlying the panels. Booties having liquid impervious cavities with a flexible interior layer that substantially covers and presses against the upper foot, the ankles, and the arch, are connected to the body covering cavity to transfer hydrostatic pressure therebetween. A capacitance reservoir with a reclosable outlet fits about the neck and is connected with the main cavity. The restaining layer covers the reservoir. The restraint layer has an assembly to expand its girth. Elastic sleeves and gloves are provided.

An alternative cavity additionally leaves uncovered the area approximately over the scapulas. Another alternative cavity substantially covers the lower back and spinal column. The reservoir is connected by cavity strips to the cavity section that covers the abdomen, while the chest area above the xiphoid level is substantially uncovered. The buttocks, arms, upper back and shoulders, and rear calves and thighs are uncovered. All cavities have suitable openings for liquid filling and emptying.

59 Claims, 5 Drawing Sheets

ACCELERATION PROTECTION ENSEMBLE AND METHOD

BACKGROUND OF THE INVENTION

This invention relates to an ensemble and method for protecting the wearer from the adverse effects of acceleration, such as is encountered in high performance aircraft.

Pilots in high performance aircraft are subjected to substantial accelerations or "G-loads" while maneuvering their aircraft. These accelerations can cause the blood to drain from the pilot's head and pool in the lower portions of the body, resulting in diminished peripheral vision, as well as dizziness, unconsciousness, and even death. The amount of G-loading the pilot can withstand is often a limiting factor in the design of the aircraft.

To counter-act the effects of G-loading, pilots sometimes engage in straining maneuvers, tensing the muscles in the lower portion of the body to reduce blood pooling. However, such measures are only temporary, are physically fatiguing, and are ineffective against high G-forces. Various attempts have been made to protect pilots from these accelerations or G-loads.

One method involves reclining the pilot when G-loads are applied. Reducing the vertical height of the pilot reduces the pressure differential in the body, reducing the tendency of the blood to pool in the lower extremities. See for example McGrady et al., U.S. Pat. No 4,787,576.

Pressure suits have been made which have a plurality of air bladders that can be filled to compress the blood vessels in the lower portions of the body to maintain the blood flow to the wearer's head. See, e.g, Van Patten, U.S. Pat. No. 4,736,731; Krogh et al., U.S. Pat. No. 4,638,791; Crosbie et al., U.S. Pat. No. 4,534,338; Crosbie et al., U.S. Pat. No. 4,243,024; Beaussant et al., U.S. Pat. No. 4,230,097. The air bladders cannot stay inflated, however, because they decrease the normal blood flow to the lower parts of the body. There is a built in delay in the response of this type of suit to the G-loading, as the suit is inflated in response to applied G-loading. Moreover, these suits usually are incapable of applying a counter pressure proportional to the pressures generated in the blood vessels by the G-loading, and thus they do not exactly counterbalance the applied G-load so the wearer usually experiences some of the affects of the G-loading.

Anti-G suits have also been made that surround the wearer, or parts of the wearer, with a column of fluid. See for example Holste, U.S. Pat. No. Re 22, 01; Beall, U.S. Pat. No. 2,335,474; Gray, U.S. Pat. No. 3,089,482; Congwer, U.S. Pat. No. 3,137,290; Kops et al., U.S. Pat. No. 3,124,123; Beaussant, U.S. Pat. No. 4,546,491; and Wurst et al., U.S. Pat. No. 4,925,133. The fluid provides a hydrostatic pressure to the wearer in proportion to the height of the column and the applied G-load. This type of suit provides continuous and instantaneous response to G-loading. However, these suits are extremely difficult to put on and take off, and once they are on, they are very heavy and cumbersome. Moreover, once in the suit, the wearer's movement is severely restricted. The wearer often needs assistance into and out of the aircraft. In some cases, special supports must be provided to support the wearer in the aircraft. Many of these suits require an external reservoir to accommodate fluctuations in the volume of liquid in the suit from G-loading, from simple body movement, and even from breathing. This may require that a special fluid reservoir be provided in the aircraft. The wearer of the suit must connect the suit to the reservoir upon entering the aircraft and disconnect the suit from the reservoir upon leaving the aircraft.

SUMMARY OF THE INVENTION

The ensemble of the present invention is adapted to protect the wearer from acceleration or G-loading, such as those experienced in high performance aircraft. Generally, the ensemble comprises a cavity means for containing liquid and at least one pressure panel. The cavity means can comprise at least one liquid-fillable bladder. The bladder and the pressure panel are shaped to cover the torso and legs of the wearer. The bladder and the panel are arranged so that when the bladder is filled with fluid, the bladder provides an external hydrostatic pressure to the portions of the body underlying the bladder, and it tensions the pressure panel applying a corresponding pressure to the portions of the body underlying the pressure panel.

In the preferred embodiment there is preferably one bladder that extends continuously from the wearer's neck to the wearer's ankles forming a continuous fluid column, although the bladder does not completely surround the wearer's torso and legs. There are preferably a plurality of pressure panels which comprise portions of a restraint garment, made of a flexible, non-distensible material, that is worn over the bladder and which fits closely over the wearer's body.

Separate booties can be provided to cover the wearer's feet. Each bootie can have means for containing liquid in the form of a bladder. The bootie bladders can be in liquid flow and hydrostatic pressure connection with the inner garment bladder. This allows hydrostatic pressure within the inner garment bladder to be transferred to the bootie bladder to provide a continuous hydrostatic column from neck to feet. The booties make it easier to put on and take off the ensemble, yet still apply pressure to the feet to prevent blood pooling.

For use in donning and doffing the ensemble, the outer garment is provided with an expansion-contraction fit assembly to provide quick adjustment in the girth of the outer garment. In a preferred embodiment, the assembly has a longitudinal side gusset that is secured with a slide fastener. This assembly is opened for donning, then closed to provide a snug fit.

The ensemble is thus of very simple construction. Since the bladder does not have to cover the entire body it is easier to put on and take off. The bladder and the restraint garment can be put on and taken off easily, while providing a relatively close, conformal fit. Since the bladder does not completely cover the wearer's body, the weight of the ensemble is less than conventional liquid-filled anti-G suits, and thus the wearer is more comfortable and has greater freedom of motion. The low weight and high mobility of the ensemble allows the wearer to move about freely, enter and exit the aircraft unaided, and sit comfortably in the aircraft without special supports.

Because of the reduced volume of the bladder and the constraining effect of the restraint garment, the variation in bladder volume during use is minimized. Thus the ensemble can be provided with its own reservoir, eliminating the need for special apparatus in the aircraft, and the need to connect the ensemble with external apparatus.

Because the fluid column is always present, the ensemble is immediately and continuously responsive to acceleration forces. The counter-force applied to the wearer's body by the ensemble responds directly to the accelerations encountered.

Modifications are also disclosed. In a first modification, the back of the torso section of the bladder is open along the sides of the back from just beneath the shoulders to an area near the armpit, with a bladder strip connecting the upper back bladder to the lower back bladder. This modification reduces the total weight of liquid contained within the ensemble, reduces encumbrance and provides improved mobility and flexibility. The relationship of the tension panels to the bladder transfers hydrostatic pressure within the bladder to the restraint garment in the back areas not covered by the bladder.

Another modification has larger openings through the bladder in the torso back section, with a connecting bladder strip extending along the spine to connect the reservoir to a lower back part of the bladder. This leaves a larger area in the upper half of the back uncovered by the bladder. Also, part of the upper chest area is uncovered by the bladder, with bladder strips connecting the reservoir to the lower torso bladder section. This modification further reduces weight. Additionally, there is no tension panel effect on the uncovered upper chest and back areas and thus no transfer of hydrostatic pressure from the bladder to the restraint garment in those uncovered torso areas. With this modification there is no need for a breathing regulator to monitor hydrostatic pressure on the chest.

These and other features and advantages will be in part apparent and in part pointed out hereinafter.

DESCRIPTION OF THE DRAWINGS

Corresponding reference numerals indicate corresponding parts throughout the several view of the drawings.

DETAILED DESCRIPTION OF PREFERRED EMBODIMENTS

General Description

The acceleration protection ensemble of this invention designed to protect the wearer from the effects of acceleration, such as those experienced in high performance aircraft. The ensemble comprises cavity means for containing liquid to allow hydrostatic pressure transfer from the upper end of the ensemble to the lower end of the ensemble. Through strategic placement of liquid filled cavity means over selected parts of the wearer's body, improved comfort, maneuverability, convenience and stamina, as well as conservation of time and effort, are achieved.

The first described embodiment of the ensemble 30 is shown in FIGS. 1 through 18. Initially, a general discussion will be given, followed by a more detailed description. In the first preferred embodiment, the ensemble 30 comprises an inner liquid containment garment 32, shown generally in FIGS. 5, 6, and 7. In this first described embodiment, the cavity means for containing liquid includes at least one bladder 34 formed within garment 32. The bladder 34 substantially covers the front halves of the wearer's legs. The extension of the bladder 34 leaves the rear halves of the wearer's calves and thighs, the wearer's buttocks, and the wearer's arms, hands, neck and head substantially uncovered.

Figure 5:
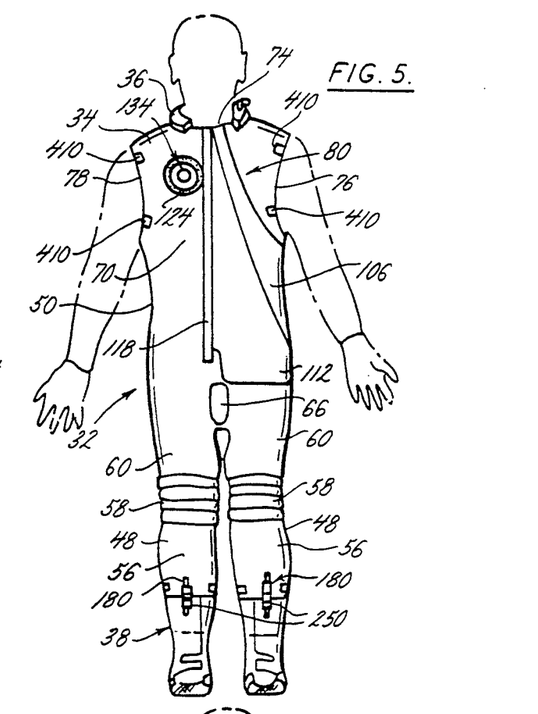
FIG. 5 is a front elevation view showing the inner garment in liquid flow connection with the booties, without the outer garment, and with parts of the pilot's body shown in dashed lines.
Figure 6:
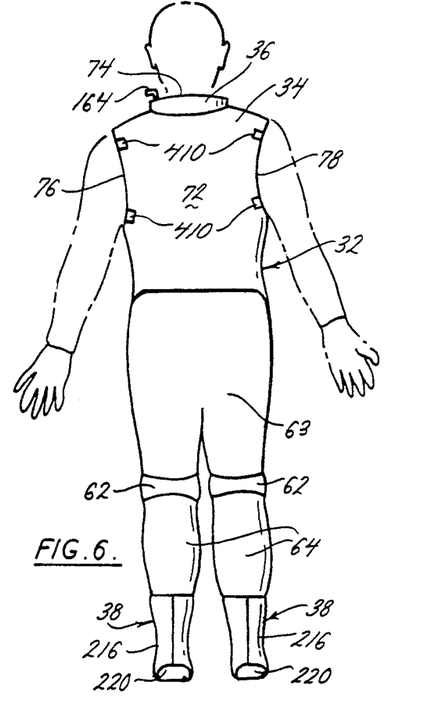
FIG. 6 is a rear elevation view of the inner garment and booties shown in FIG. 5.
Figure 7:
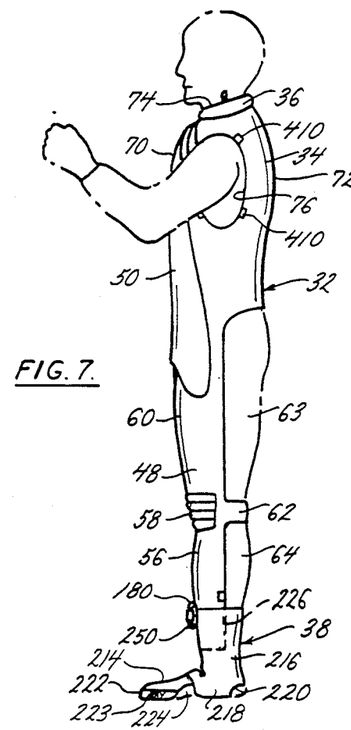
FIG. 7 is a side elevation of the inner garment and booties shown in FIGS. 5 and 6, except the pilot's arms raised to better show the side.

The inner liquid containment garment 32 has at its upper end a liquid reservoir 36 that is in liquid flow connection with the bladder 34. The reservoir 36 serves as a capacitance chamber for liquid for the bladder 34. The reservoir 36 is generally horseshoe-shaped and surrounds the wearer's neck.

Figures 16, 17, 18, 19, 20, 21, 22, 23:
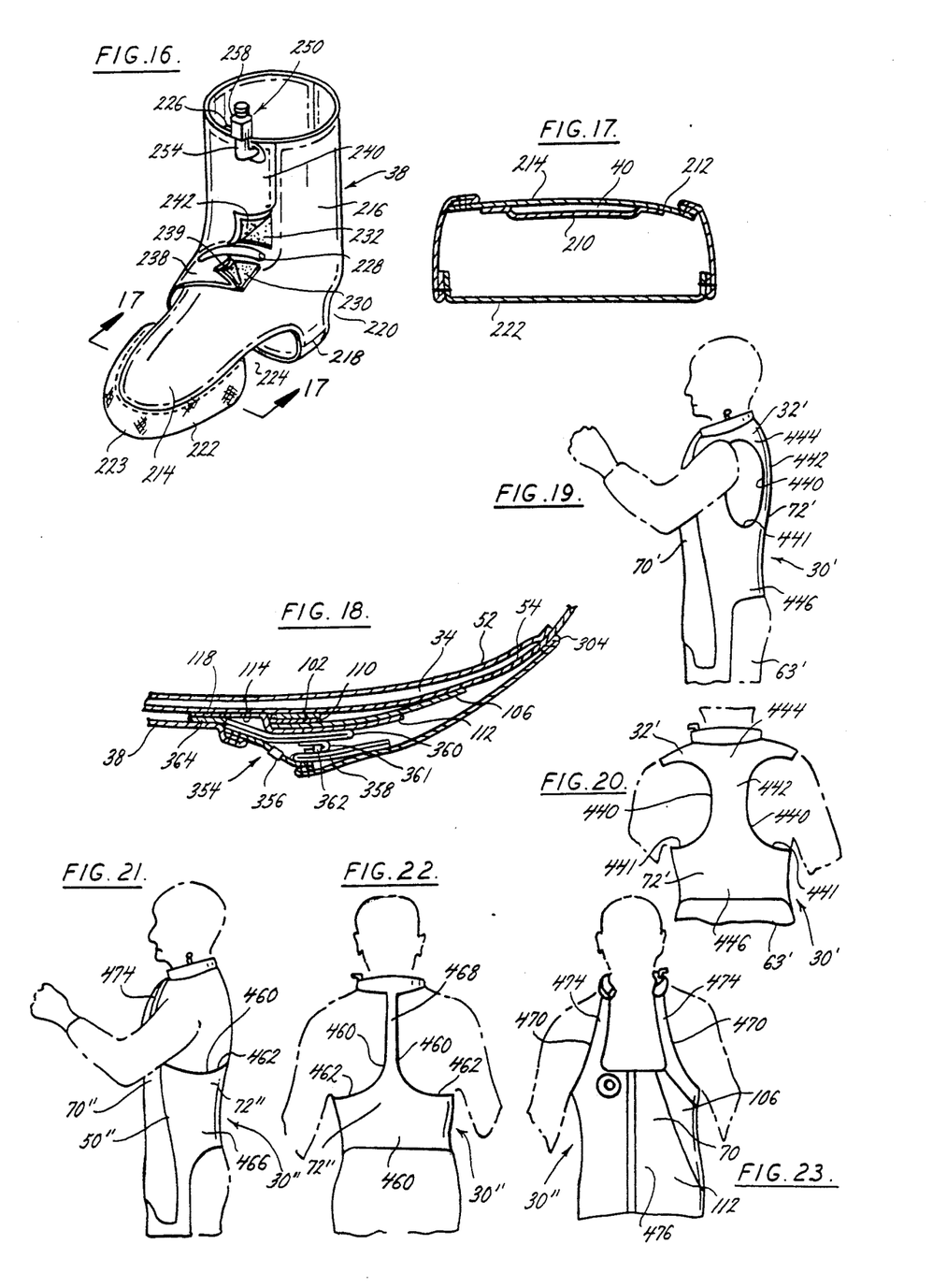
FIG. 16 is an isometric view of one of the booties, with corners of the latching strap and flap partially lifted.
FIG. 17 is a vertical cross-sectional view taken on the plane of line 17—17 in FIG. 16, showing the slipper part of the bootie and part of the bootie bladder.
FIG. 18 is a partial cross-sectional view taken on the plane of line 18—18 in FIG. 1, showing the chest openings of the inner and outer garments latched.
FIG. 19 is a side elevation of a first modification of the ensemble that has a modified inner garment which a pair of openings in the back side of the upper torso portion.
FIG. 20 is a rear elevation view of the first modification of FIG. 19.
FIG. 21 is a side elevation of a second modification of the ensemble having a modified inner garment torso with a pair of back openings larger than those of the first modification shown in FIGS. 19 and 20, and a chest section having strips that connect to the reservoir to an abdomen section and leave uncovered an upper thorax area of the chest and side areas of the chest and shoulders.
FIG. 22 is a rear elevation view of the second modification of FIG. 21.
FIG. 23 is a front elevation view of the second modification of FIG. 21.

The ensemble 30 can further include booties 38, also shown in FIGS. 5 through 7, with an individual booty 38 shown in FIG. 16. The cavity means for containing liquid can further include the bladders 40 within the booties 38. The booties 38 act as an extension of the inner garment 32. Thus, as will be described, hydrostatic pressure can be transferred between liquid within the garment bladder 34 and liquid within the bootie bladders 40. While the booties 38 could be made integrally with inner garment 32, for ease in putting the ensemble on and taking the ensemble off, the booties 38 are preferably made separate from the inner garment 32. The booties are, however, in liquid pressure communication with the bladder 34, either through direct liquid communication, or though a physical overlap of the bladder 34 and the booties 38.

The ensemble 30 additionally comprises an outer restraint garment 42. Garment 42 provides restraint against the inner garment 32 to hold it against the wearer's body, and further provides pressure panels that distribute hydrostatic pressure from the inner garment 32 over those parts of the body that are not covered by the inner garment 32.

The ensemble 30 can also include a shirt portion 44 that has elastic sleeves 45 and an inelastic torso section 46. (See FIG. 4). The shirt 44 can be worn inside the inner garment 32. Elastic gloves 47 can be provided for the wearer's hands. The resilience of the sleeves 45 and the gloves 47 helps prevent blood from pooling in the arms and hands while allowing great freedom of motion.

DETAILED DESCRIPTION

Inner Garment

Now, referring to the drawings and the components in more detail, the inner liquid containment garment 32 more particularly comprises lower, leg portions 48, and an upper, torso portion 50. The garment 32 includes an interior layer 52 and an exterior layer 54 which both extend from the bottom of the leg portions 48 to the top of the torso portion 50. Layers 52 and 54 are made from a fluid impervious, light-weight material such as urethane-coated nylon. The interior and exterior layers 52 and 54 are sealed together at their edges to form at least one fluid-impervious bladder 34 between layers 52 and 54. The bladder 34 therefore preferably extends continuously from the bottom to the top of the inner garment 32.

As seen in FIGS. 5-7, the lower leg portions 48 of the inner garment 32 comprises front, shin-covering sections 56 that extend upwardly into gored knee-covering sections 58. The sections 58 extend upwardly into front thigh-covering sections 60. Knee straps 62 extend from the knee section 58 around the rear of the knee, with the bladder 34 extending within the parts of the layers 52 and 54 that form straps 62.

Each front shin portion 56 covers the shin surface, i.e., approximately the front one-half of the lower leg, while each thigh section 60 covers approximately one-half of the corresponding thigh surface. When liquid is in the bladder 34 in the shin and thigh sections 56 and 60, the interior layer 52 contacts the front half surfaces of the shin and thigh to apply hydrostatic pressure. Between the knee straps 62 and the torso portion 50, the inner garment 32 has an opening 63, so that the wearer's buttocks are left uncovered by the inner garment 32 and approximately the rear half of the wearer's thighs are left uncovered by the garment 32. Below knee straps 62 the inner garment 32 has an opening 64 which leaves the wearer's calves uncovered by the inner garment 32. There is also an opening 66 over the wearer's pubic region.

The lower leg portion 48 of the inner garment 32 extends upwardly into the torso portion 50. The torso portion 50 has a front, chest section 70, and rear, back section 72, both formed by the interior and exterior layers 52 and 54 of the inner garment 32. The torso portion 50 has a neck opening 74 and left and right arm openings 76 and 78, respectively. The torso section 50 is sleeveless.

Figures 8, 9, 10, 11, 12:
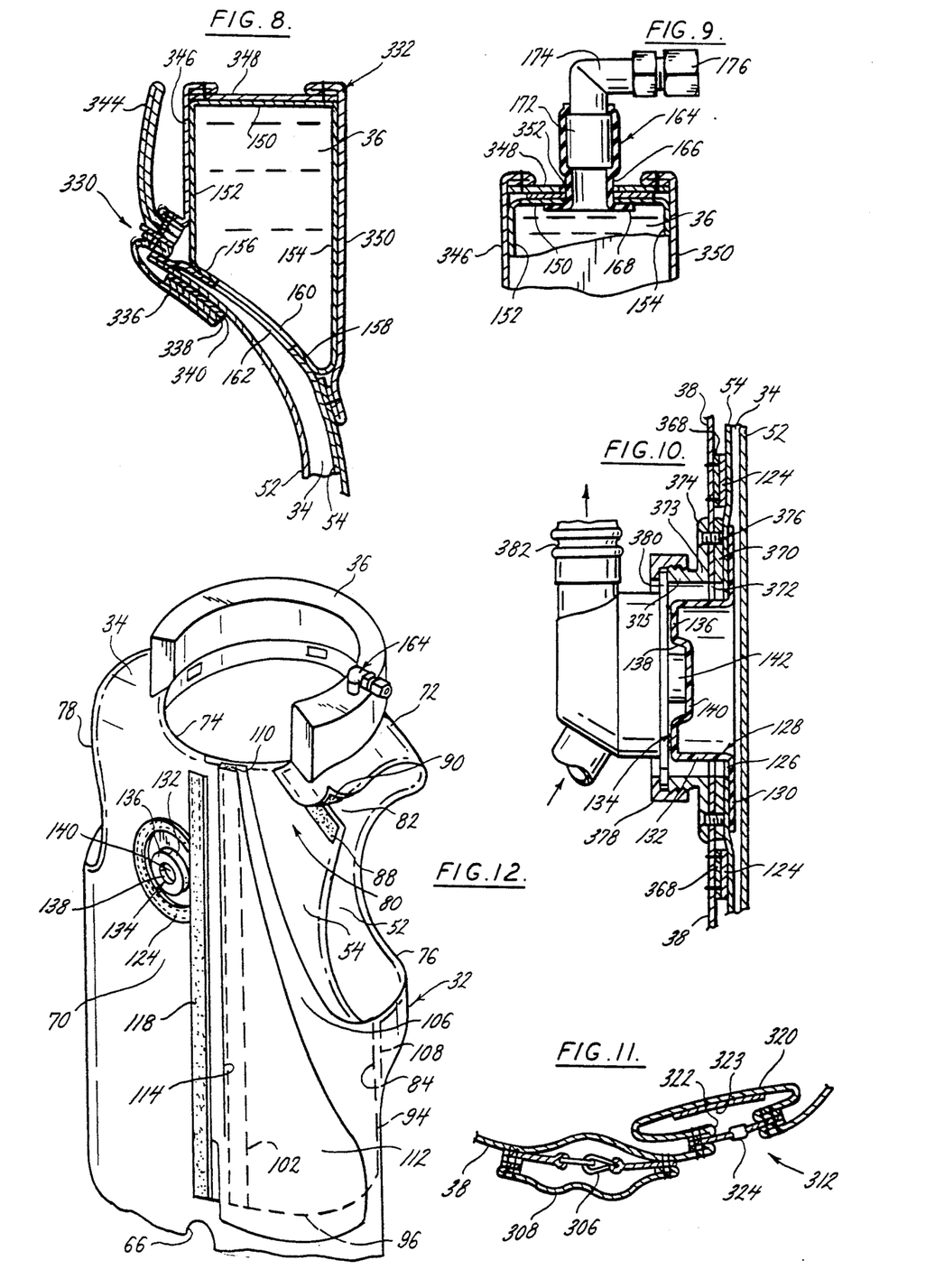
FIG. 8 is a partial cross-sectional view taken on the plane of line 8—8 in FIG. 3, showing the reservoir.
FIG. 9 is a partial cross-sectional view of the reservoir looking toward the end part of the reservoir located above the wearer's left shoulder, with portions broken away, and showing the relief valve.
FIG. 10 is a partial cross-sectional view taken on the plane of line 10—10 in FIG. 1, showing in section the ensemble's air regulator adaptor arrangement connected to an air regulator.
FIG. 11 is a partial cross-sectional view taken on the plane of line 11—11 in FIG. 2, showing the expansion-plane contraction assembly and showing the side lacing.
FIG. 12 is an isometric view of the torso portion of the inner containment garment, showing the chest flaps in a folded and latched position, with fastener strips for an opening across the left shoulder shown partially unlatched.

The torso portion 50 has a recloseable opening 80 which essentially comprises two smaller openings 82 and 84. As seen in FIG. 12, opening 82 extends from the neck opening 74 to an upper portion of the left arm opening 76. The openings 82 and 84, as well as other openings to be described hereafter, can be closed by strips of hook-and-pile type fastening material, such as those sold under the trademark Velcro ™. To secure opening 82, one strip 88 of fastening material is attached to the outer layer 54 of chest section 70 adjacent the edge of opening 82. Another strip 90 of mating fastening material is attached to the interior layer 52 of the back section 72, adjacent the edge of the opening 82. The strips 88 and 90 can overlap to latch together to close opening 82, as shown in FIG. 12.

The other opening 84 extends from the lower edge of left arm opening 76 generally downwardly, so that the chest section 70 has a vertical edge 94 along the opening 84, as shown in dashed lines in FIG. 12. Opening 84 then extends horizontally across the front of the body, forming the horizontal lower edge 96 of the chest section 70, also shown in dashed lines in FIG. 12.

To secure opening 84, the exterior layer 54 of torso portions 50 has strip 102 of fastening material that extends generally vertically from near the front of neck opening 74 to horizontal lower edge 96. A securing flap 106 extends from the vertical edge 108 of the back section 72. The flap 106 is made from a single ply of the same material as layers 52 and 54, and thus does not contain the bladder 34. The other flaps on the inner garment 32 and the booties 38 may have a similar one-ply construction. The flap 106 can fold out along the edge 108 to expose the opening 84. The free edge of the flap 106 has a strip 110 of fastening material which can overlap and secure to the strip 102, as shown in FIGS. 12 and 18, to close the opening 84.

Another flap 112 also of a single ply of material, is secured to the center of the chest section 70. The flap 112 has a vertically extending edge 114 secured to the exterior layer 54 adjacent the strip 102 of fastening material (from perspective looking at FIGS. 12 and 18). The flap 112 folds as shown in FIGS. 12 and 18, to cover the secured strips 102 and 110 to retard their disengagement.

Just to the left of the edge 114 of flap 112, a strip 118 of fastening material is attached to exterior layer 54, extends vertically down the center of chest section 70. The strip 118 functions to fasten to a strip of mating material on the restraint garment 42, as described below.

With reference now to the air regulator parts shown in FIGS. 10 and 12, the chest section 70 has a C-shaped strip 124 of fastening material secured to exterior layer 54. The open ends of the "C" abut the vertically extending strip 118. The inner garment 32 is provided with a means for detecting the hydrostatic pressure within the bladder 34 at chest level, and transferring a signal corresponding to that pressure to the wearer's breathing apparatus. With reference to FIG. 10, the exterior layer 54 has a circular opening 126 located concentrically within the C-shaped strip 124. A plastic diaphragm 128 has an annular flange 130 that has its outer surface secured to the inside surface of layer 54. The flange 130 extends into a cylindrical wall 132. The wall 132 extends into a sensing membrane 134. Membrane 134 has an outer annular ring 136 that extends into a slanted annular recessed wall 138, which extends into a central circular disc section 140. The central disc section 140 is adapted to be engaged by a pressure-sensing transducer 142 on an air regulator apparatus. As will be later described, C-shaped strip 124 latches with a corresponding strip on restraint garment 42 to hold a mounting bracket against the diaphragm 128.

Turning now to the reservoir 36 at the top of inner garment 32, the reservoir 36 can be made of the same material as layers 52 and 54. As shown in FIG. 8, the reservoir 36 has an upper wall 150 and inner and outer side walls 152 and 154. Side walls 152 and 154 have lips 156 and 158 respectively, that are secured to exterior layer 54 and which define an opening 160 between them. The opening 160 is aligned with an opening 162 in the layer 54, to place bladder 34 in liquid flow communication with reservoir 36.

FIG. 9 shows the mounting of a reservoir relief valve assembly 164. The upper wall 150 of the reservoir has a circular opening which receives the neck of a mounting collar 166. The bottom of collar 166 has an annular flange 168 sealed to the inside of the upper wall 150. The relief valve assembly 164 has an elbow tube which has a leg 172 secured within the collar 166. Leg 172 bends into a horizontal leg 174 which has a threaded open end covered by threaded cap 176.

The capacity of the reservoir 36 in this embodiment, as well as for the modifications disclosed hereafter, can be from about 1.0 quart (.946 liters) to 0.5 gallons (1.892 liters) of liquid such as water.

Focusing on the bottom of the inner garment 32, at the bottom of each leg of the lower leg portion 48 is a liquid inlet port and quick connector assembly 180. Each assembly 180 comprises an elbow tube 86 having, a generally horizontally extending leg 187 which has an outer annular flange 189. The flange 189 is in fluid-tight seal against the inner surface of the exterior layer 54. Tube leg 187 bends into a vertically extending leg 191. The assembly 180 further includes a coupler 193 which has an upper tubular extension (not shown) that fits within the vertically extending leg 191, and a larger housing 195 which can have a spring-loaded quick connect latch 198 of a type well-known in the art, mounted therein. The bottom of housing 195 has a generally circular opening which can receive a connector from a bootie 38, as will be described below.

, Booties

Figures 13, 14, 15:
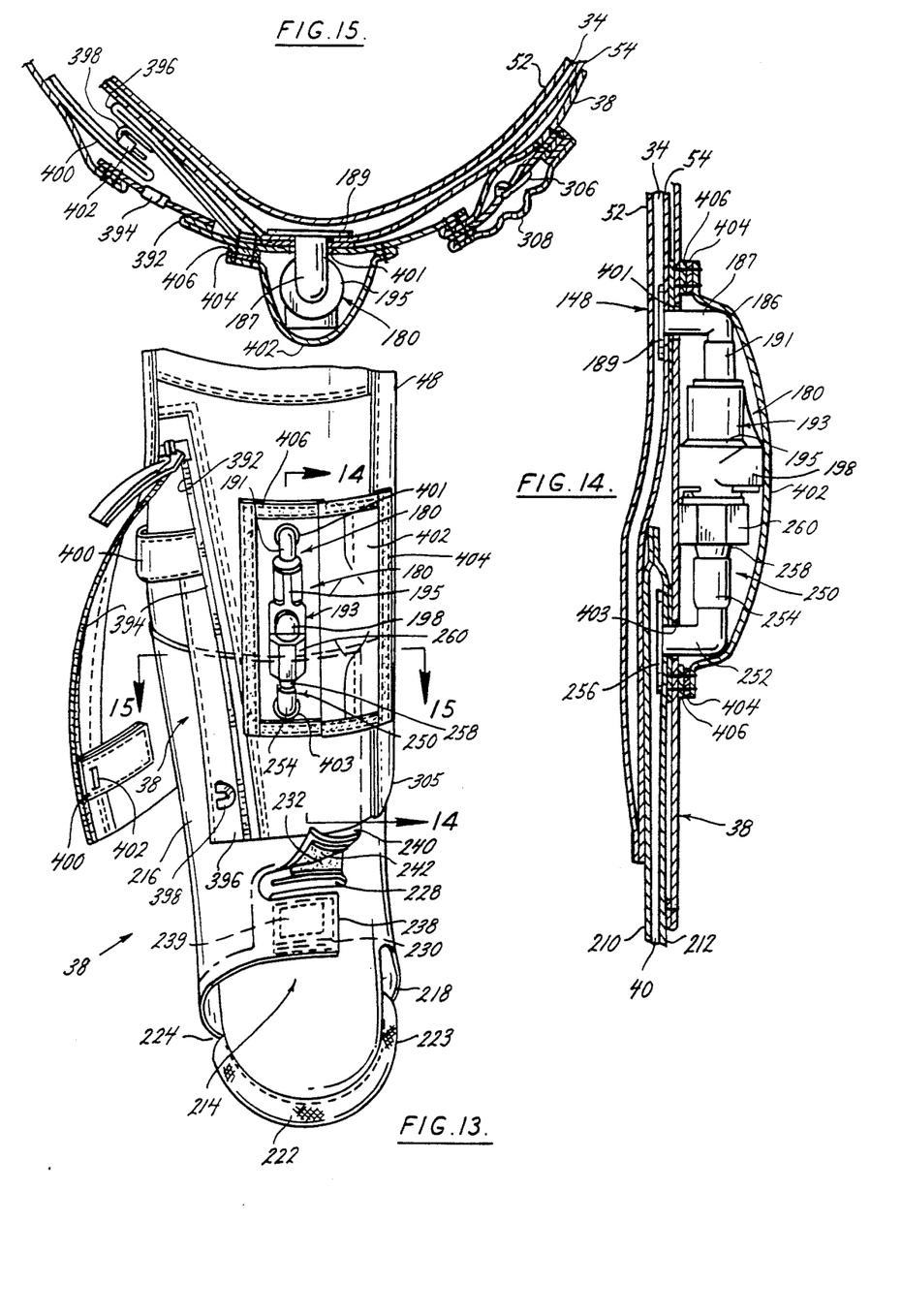
FIG. 13 is a front elevation view of a lower leg portion of the ensemble, with the outer garment's slide fastener open, one latch strap secured and one latch strap unsecured, with the bootie anklet fitted inside the inner and outer garments, and with the connection assemblies connecting the bootie bladder to the inner garment bladder.
FIG. 14 is a partial vertical cross-sectional view taken on the plane of line 14—14 in FIG. 13, showing the liquid flow connection assemblies of the inner garment and a bootie.
FIG. 15 is a partial horizontal cross-sectional view taken on the plane of line 15—15 in FIG. 13, except with the slide fastener and lower strap for the outer garment leg shown latched.

Turning now to the booties 38, and with reference to FIGS. 14–17, each bootie 38 has an inner containment layer 210 and an outer containment layer 212 which have their outer ends sealed together, as illustrated in FIG. 14, to form bladder 40 between the layers 210 and 212. At the lower portion of each bootie 38 is a foot section 214 which covers the top of the foot. Section 214 extends into an anklet section 216 which extends about the ankle. An arch strap 218 extends from side to side at the intersection of anklet section 216 with the foot section 214, leaving a heel opening 220.

Figure 1:
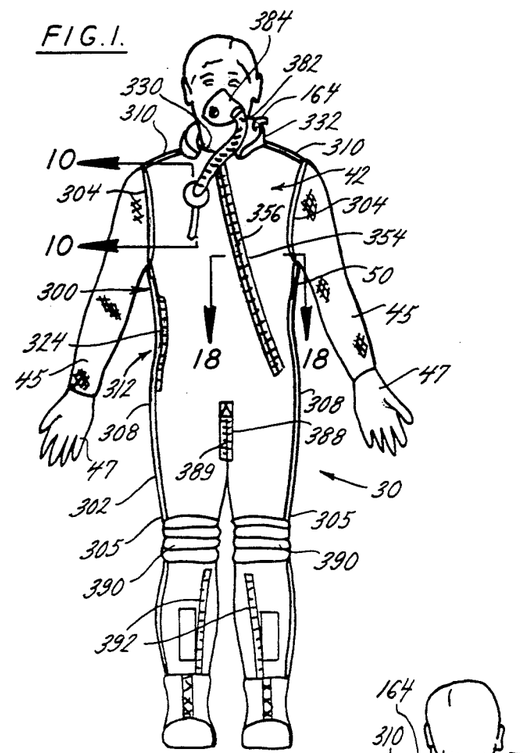
FIG. 1 is a front elevation view of a pilot wearing an ensemble constructed according to the principles of the present invention, including the inner and outer garments, booties, shirt, and gloves.
Figure 2:
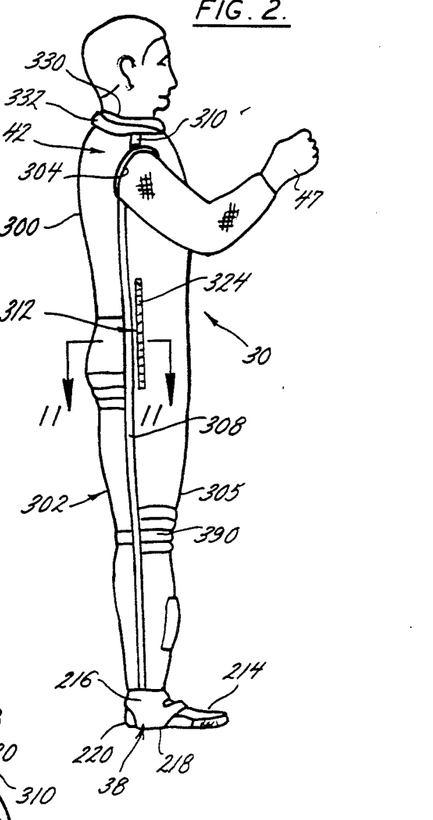
FIG. 2 is a side elevation of the pilot wearing the ensemble of FIG. 1, except the pilot's arms are raised to better show the side, and the breathing regulator is removed.
Figure 3:
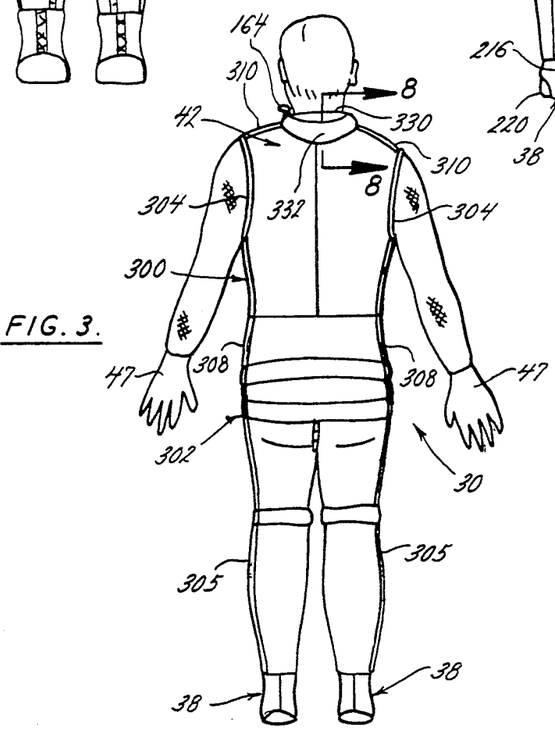
FIG. 3 is a rear elevation view of the ensemble shown in FIG. 1.

Secured about the front edge of foot section 214 is the upper edge of a flexible slipper 222, forming a toe cup 223, as seen in FIGS. 3, 16 and 17. The wearer's toes and front foot can slide into the toe cup 223 for ease in donning, while retaining the bootie on the foot. The bootie is open at 224, between the rear edge of the slipper 222 and the forward edge of the arch strap 218. The bootie 38 has a opening 226 extending generally longitudinally from the rear edge of the outstep of slipper 222 along the outstep edge of foot section 214 and thence extending upwardly through anklet section 216. A transverse V-shaped notch 228 opens into opening 226 at the upper end of foot section 214. There is a strip 230 of fastening material secured to outer layer 212 of the foot section 214, adjacent the notch 228. On the opposite side of notch 228, a strip 232 of fastening material is secured to a single layer flap that extends from the bladder forming portion of anklet 216.

A single layer fastening strap 238, which does not contain the bladder 40, is secured to the lower end of the anklet 216, and has a strip 239 of fastening material attached to its inner surface. The strap 238 can extend over opening 226 so that the strip 239 can latch to strip 230. The anklet 216 has a flap 240, which does not contain the bladder 40 within it, that has a strip 242 of fastening material secured to inner layer 210. As shown in FIG. 16, the flap 240 extends over opening 226 so that the strip 242 can latch to strip 232. This latching, along with the latching of strips 230 and 239, holds the bootie 38 snugly about the wearer's foot and ankle. The notch 228 and the space between the strap 238 and the flap 240 accommodate flexing of the ankle.

The bootie bladders 40 extend in liquid connection through sections 214, 216 and 218 so that hydrostatic pressure can be applied to the parts of the foot and ankle underlying those sections when the bladders 40 are filled with liquid.

A bootie inlet and connection assembly 250 is provided at the upper end of anklet flap 240. Assembly 250 comprises an elbow tube having a generally horizontal leg 252 and a generally vertical leg 254. The horizontal leg 252 has an end annular flange 256 which is sealed fluid-tight against the inside surface of outer bootie layer 212. A connector housing 258 has a lower tubular extension (not shown) that fits within vertical leg 254. The housing has a hexagonal nut-shaped section 260 that extends upwardly into a notched tubular insert (not shown). As is known in the art, when the tubular insert is pushed within the opening of the housing 195, the latch 198 is activated to slide into the notch in the insert to hold the insert therein, as shown in FIG. 14. The connection can be quickly released by pressing the latch 198. Such connector parts are of the type such as sold by Colder Products Company of St. Paul, Minn. as in-line coupling with 0.25 in. (0.64 cm.) flow, 0.25 in. (0.64 cm.) barb, of acetal elrin, with shut-off, Part No. PLCD 170-04-12, and coupling insert 0.25 in. (0.64 cm.) flow, 0.25 in. (0.64 cm.) barb, of delrin with shut-off, Part No. PLCD 220-04-12. With such a connection, a liquid flow relationship is established between each bootie bladder 40 and the inner garment bladder 34. All of the connections between the inner garment layers 52 and 54, as well as bootie layers 210 and 212, are liquid-tight so that the bladders 34 and 40 do not leak when they are filled with liquid.

Outer Garment

The outer restraint garment 42 comprises an upper torso section 300 and a lower section 302. Torso 300 has sleeve openings 304. Lower section 302 has a pair of legs 305. The restraint garment 42 is preferably made of a flexible, but substantially non-distensible, strong and heat resistant/fire retardant material, for example a mixture of 40% polybencimidazole (PBI) and 60% aramid fire blocking fabric such as Kevlar TM fabric. The restraint garment 302 has lacing 306 along both sides, as is customary. As shown in FIG. 11, the lacing can be covered by flaps 308 secured by strips or fastening material, for example. The lacing extends from directly beneath the bottom of sleeve openings 304 to the bottom of the legs 305. Similar lacing with flaps 310 extends across the shoulders of torso 300. As known in the art, the lacing can be adjusted to fit such garments snugly against the body.

Beneath one of the sleeve openings 304 is provided an expansion-contraction fit assembly 312 (illustrated beneath the wearer's right arm in the drawings). As seen in more detail in FIG. 11, the assembly 312 comprises a gusset sheet 320 which can be of PBI and Kevlar TM material. A longitudinal expansion slot 322 is provided along the side of the restraint garment 42. A slide fastener, in the form of a zipper 324, is secured to the garment 42, along the edges of the expansion slot 322, and to the edges of the gusset sheet 320. A protective strip 323 extends along the gusset sheet 320, under the slide fastener 324 to protect the gusset sheet from abrasion. The zipper 324 can be opened to permit expansion of gusset sheet 320, to temporarily expand the girth of the garment 42 to thereby facilitate putting the garment 42 on, and taking it off. Once the wearer is in the ensemble 30, zipper 324 can be zippered closed to close the expansion slot 322 and decrease the girth of the garment to provide a snug fit of garment 42 about inner garment 32 and against the wearer's body. The assembly 312 permits the lacing 306 along the sides and the shoulders of the garment 42 to be pre-set to a tightness comfortable to a particular wearer. This eliminates the time-consuming process of having to lace up the garment each time the ensemble 30 is put on or taken off.

At the upper end of torso 300 of garment 42 is a neck opening 330 about which a reservoir cover 332 extends. The cover 332 is preferably made of the same material as the rest of the suit. The cover 332 is generally horseshoe-shaped to conform to the shape of the inner garment reservoir 36. The reservoir 36 and the reservoir cover 332 are constructed so that the reservoir can be freely inserted into and removed from the cover to allow the inner garment to be readily assembled and disassembled. With particular reference to FIGS. 8 and 9, an inwardly extending flap 336 is sewn to restraint garment 42 about neck opening 330. The free end of flap 336 has a strip 338 of fastening material which can latch with a strip 340 of fastening material on the surface of inner garment layer 52 (FIG. 8). This sort of fastening arrangement is provided at different points along flap 336 and the top of inner layer 52 of inner garment 32 to help hold the garments 32 and 42 in a fixed relationship. Extending upwardly from the opening 330 is a cloth collar 344 which is sewn to garment 42. Reservoir cover 332 has an inner wall 346 whose lower end is sewn to collar 344 and garment 42. The wall 346 extends into a top cover wall 348 and an outer cover wall 350 which has its lower end sewn to garment 42 as seen in FIG. 8. The outer cover wall 350 may have a zipper therein, extending around the wearer's neck, to provide access to the reservoir 36. With reference to FIG. 9, top cover wall 348 has a circular opening 352 through which extends the collar 166 of the reservoir relief valve assembly 164. The cover 332 restrains protects the reservoir 36 and restrains its expansion.

A recloseable opening 354 extends diagonally across torso 300 of garment 42 from the front of neck opening 330. As seen in more detail in FIG. 18, the edges of the garment 42 along opening 354 have a slide fastener in the form of a zipper 356 sewn thereto. The opening 354 is additionally secured with a plurality of straps, such as straps 358, which are sewn at one end to garment 42 along the edge of opening 354. A flap 360 of fabric is sewn to garment 42 along the opposite edge of the opening 354. There are a plurality of metal hooks 361 on the flap 360 that are adapted to engage metal loops 362 on the straps 358. As shown in FIG. 18, when the zipper 356 is closed and the hooks 361 and loops 362 are latched, the opening 354 is securely closed. A strip 364 of fastening material is sewn to the inside of garment 42 adjacent the sewn edge of flap 360. The strip 364 on the outer garment latches with the strip 118 on the inner garment to help hold the torso portion 50 of the inner garment in proper alignment relative to the torso section 300 of the restraint garment 42.

Referring to FIG. 10, sewn to the inside of the torso Section 300 of the restraint garment 42 is a C-shaped strip 368 of fastening material of the same shape as C-shaped strip 124 on the torso portion 50 of the inner garment 32. An annular metal plate 370 surrounds a circular hole 372 on the interior of the torso Section 300. On the exterior side of the torso 300, a metal collar 373 having a flat annular flange 374 and a threaded sleeve 375 surrounds the hole 372. The flange 374 is secured by screws 376 passing through holes in garment 42 to the inner plate 370. A threaded ring 378 screws onto threaded sleeve 375 to hold a rim 380 of the breathing regulator thereto. The regulator has a hose 382 connected to a nose and mouth cover 384 as is known in the art. The breathing regulator provided can be of the type disclosed in U.S. patent application Ser. No. 402,359 filed on Sept. 5, 1990, having the title "Anthropomorphic Tank-Suit", which application is herein incorporated by reference. The C-shaped fastener strips 124 and 368, when secured, help hold the transducer 142 of the regulator in position relative to the inner garment diaphragm 128. The regulator can thus sense the pressure at the chest level and adjust the content and or pressure of the air supply accordingly, as is known in the art. Of course, some other connection with the air regulator, preferably one that provides measurement of the liquid pressure in the bladder 34, could be used.

The outer garment 42 has a urinary access opening 388 that can be secured by a slide fastener such as a zipper 389. The outer garment legs 305 can have gored knee sections 390 to facilitate more comfortable bending.

Extending from just beneath each knee section 390 is a "recloseable opening 392. Particularly referring to the opening 392 shown in FIGS. 13 and 15, the edges of the opening 392 have a slide fastener, such as a zipper 394, secured thereto (only one of which is visible in FIG. 13). A fabric flap 396 is secured along one edge of opening 392. The flap 396 has a pair of metal hooks 398 secured thereto. On the opposite side of opening 392, the inside of the legs 305 has the ends of two straps 400 sewn thereto. Each strap 400 has a metal loop 402 which latches with hooks 398. The upper strap 400 is shown latched and lower strap 400 unlatched in FIGS. 13 and 15. In the front half of the legs 305 are a pair of circular openings 401 and 403 through which can extend the elbow tube 187 from the inner garment 32 and the elbow tube 252 of the bootie 38. A rectangular flap 402, having its inner edge sewn to the outside of leg 305, has strips 404 of fastening material extending about its perimeter to latch with matching strips 406 sewn to the exterior of leg 305. When closed and latched, flap 402 covers and protects the connector assemblies 180 and 250.

Additionally, other fastening arrangements can be provided to hold garment 32 to garment 42. For example, the outer garment 42 can have spaced about each sleeve opening 304 a plurality of straps having snaps that latch with matching snaps 410 secured to the interior layer 52 of inner garment 32. Also, along the sides of outer garment 42 can be a plurality of spaced straps with snaps that latch with matching snaps secured to exterior layer 54 of inner garment 32.

Figure 4:
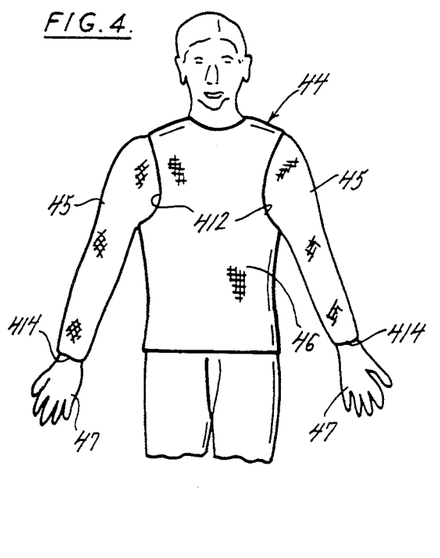
FIG. 4 is a partial front elevation view of a pilot wearing the shirt without the inner containment garment or the outer restraint garment.

Turning now to the shirt 48, as shown in FIG. 4 the elastic torso section 46 can comprise cloth fabric such as cotton. The shirt torso 46 has sleeve openings with edges 412 which are spaced somewhat inwardly of the shoulders and underarms to permit elastic sleeve 45 to cover the shoulders. The elastic sleeves 45 are connected to shirt torso 44 about the sleeve opening edges 412 so that the elasticity of the sleeve 45 applies pressure from the sleeve ends 414 located about the wearer's wrist to the edges 412. Elastomer material such as Spandex TM material can be used for the elastic sleeve 42, as well as for the elastic gloves 47.

Operation

Certain operative aspects have been previously discussed. The ensemble 30 is donned easily and quickly by the wearer without the need of assistance from other persons or from supporting equipment except for the use of liquid transfer equipment to fill and drain the inner containment garment 32.

The wearer first dons the shirt 44 and the elastic sleeves 45 as shown in FIG. 4. The wearer will have preset the lacing 306 so that the outer restraint garment 42 is preset to the wearer's particular body structure. The aforementioned fastener strips and snaps that connect the inner garment 32 to the outer restraint garment 42 are secured. To don the ensemble 30, the expansion-contraction assembly 312 is opened by zipper 324 to expand the midsection of restraint garment 42. The opening 354 in outer garment torso 300 is unsecured, with zipper 356 open and straps 362 unlatched. The inner garment torso openings 82 and 84 are unlatched. At the lower end of outer garment legs 305, the openings 392 are unlatched and exposed.

The wearer then essentially grasps the ensemble 30 as one would don overalls, and while seated, inserts his legs through the leg portion 48 of the inner garment 32, and the legs 305 of the restraint garment 42. The wearer can then stand upright and pull the ensemble 30 up to ensure a tight, snug fit from the ankles to the hips, especially in the seat and crotch area. Tabs can be provided on the exterior of outer garment 42 to facilitate grasping and upward pulling. Next the wearer extends his arms through the sleeve openings 76 and 78 in inner torso and 304 of the outer torso sections with the right arm first extended. The inner garment torso openings 82 and 84 are then secured as previously described, and the flap 112 extended to the position shown in FIG. 12. The expansion-contraction assembly 312 is closed by closing zipper 324. The outer garment fastening straps 358 are then latched to flap 360 and zipper 356 is closed to secure the torso opening 354.

Next, the booties 38 can be donned by inserting the toes and front foot into the toe cup 223 formed before slippers 222 and foot coverings 214. The heels extend through heel openings 220. The bootie straps 238 and flaps 240 are latched. As seen in FIG. 13, the anklets 216 are then fitted within the outer garment legs 305, overlapping the lower ends of the legs 48 of the inner garment 32. The lower leg straps 400 are latched to flap 396, and the zipper 394 is closed to secure the garment legs 305 snugly about bootie anklets 216. The snugness of the fit is such that even without the liquid flow connection between connection assemblies 180 and 250, the pressure exerted by the overlap of inner garment lower leg portion 48 when filled with liquid, against the anklet 216 when the bootie bladder 38 is filled with liquid, effectively transfers hydrostatic pressure from the bladder 34 to the bootie bladders 40.

The wearer can then don standard flight boots over the booties 38. The flight boots restrain outward expansion of the bootie bladders 40, so that when the bladders 40 are filled, the hydrostatic pressure is transferred to the wearer's feet and ankles. The wearer can then connect a hose to each connector housing 258 to fill the booties with a liquid, preferably a liquid having approximately the same specific gravity as blood, such as water. Then, with reservoir cap 176 unfastened to allow air to escape from the reservoir 36, the hose can be connected to each housing 195 on the inner garment 32 so that water fills the inner garment bladder 34. Water rises within bladder 34 to pass through the upper openings 160 and 162 into the reservoir 36. The walls 150, 152 and 154 of the reservoir can be compressed during filling so that the reservoir 36 is able to expand during use to accommodate water flow into the reservoir 36 when bladder 34 is compressed, for example as a result of the wearer's movement. When the bladder and reservoir are sufficiently filled, the relief valve cap 176 can then be secured. The bootie and inner garment connection assemblies 250 and 180 are connected so that there is liquid flow connection between the bootie bladders 40 and inner garment bladder 34. If desired, the connection assemblies 258 and 150 can be connected by a T-tube which can be connected to a hose so that the bladders 34 and 40 and reservoir 36 can be filled thereby.

The flight gloves can be donned after the inner garment 32 and outer garment 42, booties 38 and flight boots are donned.

The wearer can then rise and move to the aircraft. The fit is such that transit to the aircraft is accomplished. Without any significant encumbrance or mobility restriction. Stairs are readily negotiated and the wearer can easily run while wearing ensemble 30. Ingress and egress to and from the aircraft is also without significant encumbrance. The reservoir 36 acts as a capacitive chamber so that as the wearer flexes and bends his body, fluids displaced by the compression of inner garment bladder 34 and bootie bladders 40 can be accommodated by the reservoir 36. The wearer can function as a pilot of a high speed aircraft and be subjected to G forces when rapid changes in flight directions occur. The cavity means for containing liquid, exemplified by bladders 34 and 40, permit the water contained therein to exert a pressure head that is proportional to the height of the fluid column of the cavity means. The restraint garment 42 presses the cavity means against the wearer's body so that the cavity means exerts its same hydrostatic pressure to the restraint garment 42, which pressure is transmitted by the restraint garment to the areas not covered by the cavity means exemplified by bladder 34.

The pilot can conduct all flight duties with a minimum of restrictions to mobility and with minimal additional workload. There is no need to connect the bladders 34 and 40 or the reservoir 36 to aircraft-mounted fluid reservoirs, and thus it is unnecessary to bother with connections to other reservoirs.

The part of bladder 34 that extends behind the wearer's knees through inner garment knee straps 62 permits full surface contact for liquid pressure transmission to the back of the knee when the knee is flexed and a concave area is formed. Because of the bend in the restraint garment 42 at the area covering knee strap 62, there can be difficulty in the outer garment applying sufficient tension against that back knee portion of the wearer. The knee strap 62 overcomes that difficulty.

The ensemble can be easily doffed. First, the front outer garment opening 354 and the inner torso openings 82 and 84 can be unfastened. The expansion/contraction assembly 314 can be opened. The lower leg openings 392 can be unfastened, the connection assemblies 180 and 250 disconnected, and the bladders 34 and 40 drained. The flight boots and booties 38 can then be removed. The wearer can then pull the torso portions 50 and 300 downward and removing his legs from the garments 32 and 42.

The embodiment provides satisfactory tolerance to G loads under centrifuge testing. During one test, a test pilot wearing the ensemble substantially as described herein was accelerated in a centrifuge from a stopped position to a G load of 1.2 G, which was held steady for about 20 seconds. The G load was increased at about 0.5 G per second to a final load of 7.0 G. The 7.0 G load was reached at a clock time of about 40 seconds, and then remained steady until the run was terminated after five minutes at 7.0 G. After three minutes at 7.0 G the centrifuge rider noted that he had to breathe harder, however, data showed that he had no noticeable increase in respiratory rate or depth. Such feeling of breathing harder was most likely the result of slow carbon dioxide buildup in the blood because of reduced efficiency of gas exchange in the lungs, which is an expected result of prolonged exposure to the G load. During the centrifuge run, the following characteristics were noted: The centrifuge rider did not have to do any volitional work to sustain the G load, for example, he did not have to do an M-1 maneuver or a straining maneuver. The rider did not report any loss of peripheral vision. The rider communicated easily with no strain in his voice. The rider was comfortable and moved his arm with apparent ease. For the full five minutes of the 7.0 G load, the rider was protected from the effects of such load.

During a second test, a test pilot wearing the ensemble substantially as described herein was accelerated from a stopped position to a G load of 1.2, which was held steady for about 20 seconds. The G load was then increased 1.0 G/sec to a load of 10 G. This load was maintained for 3 minutes. The test pilot performed no strain maneuvers for the first 1 minute and 25 seconds, but did perform minor strain maneuvers for the last minute and 35 seconds in order to maintain clear vision. This test pilot maintained consciousness and was otherwise protected from the effects of the 10 G load.

Modifications

FIGS. 19 and 20 show a first modification of the ensemble 30' featuring a modified inner liquid containment garment 32' with a modified torso portion 30'. The chest section 70' of this modification is the same as for the embodiment shown in FIGS. 1–18. However, the back section 72' has a pair of generally C-shaped openings 440 that open to the sides of back 72' along the shoulders. The lower edge 441 of each opening 440 opens adjacent to but below the wearer's armpits, approximately 2 to 3 inches (approximately 5.1 to 7.6 centimeters) below the armpits. A connecting inner garment strip 442 which contains the inner garment bladder, extends between the two openings 440 to connect an upper shoulder section 444 of back section 72' with a lower full back section 446. The center part of strip 442 overlies the wearer's spinal column but is wider than the spinal column. The width of the strip 442 at its narrowest points is from 3 inches (7.62 cm.) to about 5 inches (12.7 cm.). Sections 444 and 446 do contain the inner garment bladder, so that when the inner garment 32' is filled with liquid, there is liquid coverage over the wearer's body for the areas covered by sections 442, 444 and 446. Therefore, the area left uncovered by openings 440 is approximately that which extends over the wearer's scapulas. Inner garment 32' has the same structure for the lower leg portion 48' as shown in the description of the previous embodiment, with the same openings such as opening 63'.

The operation of the modification in FIGS. 19 and 20 is otherwise the same as that discussed for the embodiment of FIGS. 1 through 18. In this modification there is a tension panel effect created by the bladder's hydrostatic pressure being transferred to the restraint garment 42, Tension of the restraint garment 42' thus is applied across that part of the wearer's body uncovered by the openings 440. This modification reduces the total weight of liquid contained within the inner garment, further reduces encumbrance, and provides improved mobility and flexibility.

FIGS. 21 through 23 show yet another modification as ensemble 30" which has an inner garment 32" with torso 50" having modifications in both the chest 70" and back 72" sections.

The back section 72" has a pair of openings 460 that are larger than the openings 440 in FIGS. 19 and 20. Openings 460 have lower curved edges 462 that form a lower torso back section 466 which is connected by an inner garment strip 468 to the reservoir 36. The inner garment strip 468 contains the inner garment bladder and is much more narrow than the strip 442 in the FIG. 19 and 20 modification. Strip 468 is approximately the width of the wearer's spinal vertebrae over which strip 468 extends, with the length of strip 468 ranging from 12 inches (30.5 cm.) to 17 inches (43.2 cm.) for different size ensembles, and being about 15 inches (38.1 cm.) for an ensemble fitting a wearer who is six feet tall. The FIG. 21 through 23 version does not have an upper shoulder section such as 444 in FIGS. 19 and 20, and thus the torso 50" leaves the wearer's upper shoulders and upper back uncovered.

As can be seen in FIGS. 21 and 23, the back openings 460 extend forwardly across to the chest section 70" to open to a pair of chest open areas 470 that extend from the upper arm area across the side parts of the chest. Chest section 70" also has a central opening 472. Chest section 70" has a pair of connecting strips 474 that do extend downwardly from reservoir 36" to connect with a lower abdomen section 476. As shown, the width of each strip 474 is about 1 inch (2.54 cm.) at the junction 478 with reservoir 36" and about 2 inches (5.08 cm.) at the junction 480 with abdomen section 476. The width of each strip 474 can range from about 1 inch (2.54 cm.) to 2 inches (5.08 cm.). The torso section 50" thus has liquid coverage over the wearer's body that comes only up to the mid-thorax about the level of the xiphoid. With this modification, the openings 460, 470 and 472 are large enough so that in combination with the fitting of the restraint garment 42", there is no tension panel effect by the restraint garment 42" against the body areas left uncovered by those openings. By not covering the upper thorax with liquid, the wearer will not require pressurized breathing assistance when exposed to G forces. This is because the wearer's chest will not be exposed to hydrostatic pressure as in the other described embodiments. This modification therefore will be suitable for use in tactical aircraft that are not able to sustain very high G forces or which do not have a pressure breathing regulator. Further, this modification weighs less than the other embodiments because of the reduced liquid volume. As a result, greater mobility results, with less encumbrance.

The remaining portions of the inner garment 32" are similar to those described for ensemble 30 except that in view of the elimination of part of the chest coverage by chest section 70" the size of, and the area covered by, the chest flaps described is reduced. For example, flaps 106" and 112" do not have the upper portions that flaps 106 and 112 have. The lower leg portion 48" of inner garment 32" is the same as described for ensemble 30.

As various changes could be made in the above constructions without departing from the scope of the invention, it is intended that all matter contained in the above description or shown in the accompanying drawings shall be interpreted as illustrative and not in a limited sense.

What is claimed is:

1. An acceleration protection ensemble for fitting about the body of a person aboard an aircraft to protect the person from the effects f acceleration such as those experienced in high performance aircraft, comprising:

(a) means for forming a body covering cavity for containing a liquid therein, said cavity forming means being made from a liquid impervious material, and comprising a flexible first interior layer for pressing against the body, said cavity substantially covering the person's shins and the front half of the thighs, and covering the person's abdomen, chest, and back, the cavity being shaped to substantially avoid covering the person's buttocks, arms, and the rear half of the person's calves and thighs;

(b) means for restraining hydrostatic pressure that is created within the cavity by applied G forces, said means comprising a second layer of flexible indistensible material which second layer is located exterior to the said interior layer, said second layer shaped to cover substantially all of the cavity so that substantially all of the cavity is between the body and the second layer when the ensemble is worn by the person, the second layer further covering substantially all of the person's buttocks, and the rear halves of the calves and thighs to provide a pressure panel against parts of the body not covered by the cavity so that when the cavity is filled with liquid and the second layer is fit snugly about the body, an external hydrostatic pressure is applied to the portions of the body underlying the cavity, and the cavity tensions the pressure panels of the second layer to apply a corresponding pressure to the portion of the body underlying the pressure panels of the second layer.

2. The acceleration protection ensemble of claim 1, further comprising a liquid containment garment comprising said first layer, and comprising a third layer interior to the second layer, with the cavity located between the first and third layers.

3. The acceleration protection ensemble of claim wherein the first and third layers are connected to each other and the cavity is a single continuous cavity.

4. The acceleration protection ensemble of claim 1 further comprising means for providing liquid flow into and out of the cavity, and means for blocking the liquid flow means to prevent liquid located within the cavity from flowing out of the cavity.

5. The acceleration protection ensemble of claim 1, further comprising the cavity means and said interior layer extending around the rear of the person's knees about the area where the knee flexes when bent.

6. The acceleration protection ensemble of claim 4 wherein the means for providing liquid flow and means for blocking liquid flow comprise a port opening into the cavity in the portions of the cavity covering the front halves of the person's calves, and means for closing each port.

7. The acceleration protection ensemble of claim 6 wherein said port is a tube, and further comprising the port having an opening for receiving a connecting hose to permit the cavity to be filled with liquid.

8. The acceleration protection ensemble of claim 1 further comprising a pair of booties, each bootie having means for forming a cavity for containing liquid therein, said bootie cavity forming means comprising liquid impervious material, said cavity forming means of each bootie having a flexible interior layer for pressing against parts of the foot, each said bootie cavity substantially covering the upper surface of the wearer's foot.

9. The acceleration protection ensemble of claim 8 wherein each said cavity for each bootie substantially covers the person's ankle.

10. The acceleration protection ensemble of claim 8 wherein the cavity for each bootie extends beneath the foot in an area about the wearer's arch.

11. The acceleration protection ensemble of claim 8 further comprising means for connecting the body covering cavity with each bootie cavity so that hydrostatic pressure can be transferred through such connection from the body covering cavity to each of the bootie cavities when the said cavities are filled with liquid.

12. The acceleration protection ensemble of claim 11 wherein the means for connecting comprises the interior layer of the body covering cavity covering an upper part of each bootie cavity so that such overlap in coverage allows for transfer of hydrostatic pressure from said first cavity to each bootie cavity.

13. The acceleration protection ensemble of claim 11 wherein the means for connecting comprises connector assemblies that can be connected and disconnected, and wherein when said means for connecting is in the connected position, the body covering cavity and bootie cavities are in liquid flow connection with each other.

14. The acceleration protection ensemble of claim 13, wherein each bootie cavity forming means comprises first and second layers of liquid impervious material, with a bootie cavity formed between said first and second bootie layers.

15. The acceleration protection ensemble of claim 14, wherein the first and second layers of each bootie are connected to each other and each bootie cavity is a single cavity.

16. The acceleration protection ensemble of claim 1, further comprising a reservoir for containing liquid, said reservoir comprising liquid impervious material, said reservoir being in liquid flow connection with the cavity.

17. The acceleration protection ensemble of claim 16 wherein said reservoir is positioned about the person's neck when the ensemble is worn.

18. The acceleration protection ensemble of claim 17, wherein the reservoir has outlet means for allowing liquid to pass out from the reservoir the said outlet means being separate from the connection of the reservoir with the cavity, and further comprising means for closing the reservoir outlet means.

19. The acceleration protection ensemble of claim 18 wherein the second layer of flexible, indistensible material extends to cover the reservoir.

20. The acceleration protection ensemble of claim 1, further comprising elastic sleeves for fitting snugly about the person's arms.

21. The acceleration protection ensemble of claim 2, wherein the restraining means and the second layer further comprise an expansion-contraction fit assembly extending longitudinally along the second layer in an area about the person's waistline, comprising the second layer having a longitudinal opening, and means for opening and closing the longitudinal opening, so that when the longitudinal opening is in the open position, the girth of the second layer is expanded to allow the person to more easily don and doff the second layer and so that when the longitudinal opening is closed, the girth of the second layer fits snugly about the adjacent cavity area.

22. The ensemble of claim 21 further comprising a gusset sheet connecting the second layer on opposite sites of the longitudinal opening.

23. An acceleration protection ensemble for fitting about the body of a person aboard an aircraft to protect the person from the effects of acceleration such as those experienced in high performance aircraft, comprising:
(a) an inner garment, said inner garment having means for forming a body covering bladder for containing liquid therein, the bladder having a top the bladder being comprised of liquid impervious, flexible material and having an interior layer for pressing against the body and an exterior layer, with the bladder formed by the interior and exterior layers, the said bladder substantially covering the person's shins and front half of the thighs and the area around the rear of the knees about the area where the knees flex when bent, and covering the person's abdomen, chest and back, while leaving the person's buttocks, arms, and the rear half of the calves and thighs substantially uncovered;
(b) an outer restraint garment providing means for restraining hydrostatic pressure that is created within the cavity by applied G forces, said means for restraining the inner garment bladder comprising flexible, indistensible material with a layer of such material located exterior to the bladder; said restraint garment layer shaped to cover substantially all of the bladder so that substantially all of the bladder is between the body and the restraint garment when the ensemble is worn by the person, the restraint garment layer further covering substantially all of the person's buttocks, and the rear half of the calves and thighs to provide pressure panels against parts of the body not covered by the bladder, so that when the bladder is filled with liquid and the restraint garment is fit snugly about the bladder, an external hydrostatic pressure is applied to the portions of the body underlying the bladder, and the bladder tensions the pressure panels of the restraint garment to apply a corresponding pressure to the portion of the body underlying the pressure panels of the restraint garment; and
(c) a liquid reservoir in liquid flow connection with the bladder, the reservoir being comprised of liquid impervious material, and the reservoir being located near the top of the bladder when the person is in the upright position, so that the reservoir can act as a capacitance chamber for liquid in the bladder, the reservoir having an outside and the inner garment having an outside, the reservoir having a relief opening for allowing liquid to flow outside the reservoir and outside the inner garment, and means for closing the relief opening.

24. The acceleration protection ensemble of claim 23 further comprising a pair of booties, each bootie having means for forming a bladder for containing liquid therein, said bladder comprising liquid impervious material and having a flexible interior layer for pressing against parts of the foot, each said bootie bladder substantially covering the upper surface of the wearer's foot and covering the wearer's ankle and extending beneath the foot in an area about the wearer's arch.

25. The acceleration protection ensemble of claim 24 further comprising means for connecting the inner garment bladder with each bootie bladder to allow hydrostatic pressure to be transferred through such connection from the inner garment bladder to each of the bootie bladders when said bladders are filled with liquid, said connecting means comprising connector assemblies that can be connected and disconnected, and which in the connected position place the inner garment bladder in liquid flow connection with the bootie bladders.

26. An acceleration protection ensemble for fitting about the body of a person aboard an aircraft to protect the person from the effects of acceleration such as those experienced in high performance aircraft, comprising:
 (a) means for forming a body covering cavity for containing liquid therein, said cavity forming means being made from a liquid impervious material, and comprising a flexible first interior layer for pressing against the body, said cavity substantially covering the person's shins and the front half of the thighs, and covering the person's abdomen, chest, and back, except for the area that approximately extends over the scapulas, the cavity being shaped to substantially avoid covering the person's buttocks, arms, and the rear half of the person's calves and thighs, and the area of the back approximately extending over the scapulas;
 (b) means for restraining hydrostatic pressure that is created within the cavity by applied G forces, said means comprising a second layer of flexible indistensible material which second layer is located exterior to the said interior layer, said second layer shaped to cover substantially all of the cavity so that substantially all of the cavity is between the body and the second layer when the ensemble is worn by the person, the second layer further covering substantially all of the person's buttocks, and the rear halves of the calves and thighs, and the area of the back extending approximately over the scapulas, to provide a pressure panel against parts of the body not covered by the cavity so that when the cavity is filled with liquid and the second layer is fit snugly about the body, an external hydrostatic pressure is applied to the portions of the body underlying the cavity, and the cavity tensions the pressure panels of the second layer to apply a corresponding pressure to the portion of the body underlying the pressure panels of the second layer.

27. An acceleration protection ensemble for fitting about the body of a person aboard an aircraft to protect the person from the effects of acceleration such as those experienced in high performance aircraft, comprising:
 (a) a reservoir comprised of liquid impervious material to act as a liquid capacitance chamber, and located about the person's neck;
 (b) means for forming a cavity for containing liquid therein, said cavity forming means being made from a liquid impervious material, and comprising a first flexible interior layer for pressing against the body, said cavity having sections substantially covering the person's shins and the front half of the thighs, and covering the person's abdomen, lower back and overlying an area along the spinal column, with a pair of cavity forming strips extending from the reservoir to connection with the section of the cavity covering the abdomen at the person's mid-thorax at a level near the person's xiphoid so that the part of the person's chest above said level and not covered by the pair of strips is left substantially uncovered by the cavity, the cavity being shaped to further substantially avoid covering the person's buttocks, arms, the upper back and shoulders, and the rear half of the person's calves and thighs;
 (c) means for restraining hydrostatic pressure that is created within the cavity by applied G forces, said means comprising a second layer of flexible indistensible material which second layer is located exterior to the said interior layer, said second layer shaped to cover substantially all of the cavity so that substantially all of the cavity is between the body and the second layer when the ensemble is worn by the person, the second layer further covering substantially all of the person's buttocks, and the rear halves of the calves and thighs to provide a pressure panel against parts of the body not covered by the cavity except for those parts of the person's torso that are uncovered so that when the cavity is filled with liquid and the second layer is fit snugly about the body, an external hydrostatic pressure is applied to the portions of the body underlying the cavity, and the cavity tensions the pressure panels of the second layer to apply a corresponding pressure to the portions of the body underlying the pressure panels of the second layer.

28. A method of protecting a person from some of the effects of acceleration such as experienced in high performance aircraft, the method comprising the steps of:
 (a) clothing the person in a liquid-fillable bladder shaped to closely fit substantially over and cover the person's shins and the front half of the thighs, and covering the abdomen, chest, and back, while leaving substantially uncovered the person's buttocks, arms, and rear half of the person's calves and thighs;
 (b) clothing the person with a restraint garment layer exterior to the bladder to restrain hydrostatic pressure created within the bladder by applied G forces, said restraint layer being shaped to cover substantially all of the bladder so that substantially all of the bladder is between the body and the restraint layer, the clothing of the restraint layer covering substantially all of the person's buttocks and the rear halves of the calves and thighs and providing a pressure panel and application of pressure by the panel against parts of the body not covered by the bladder;
 (c) filling the bladder with liquid to form a thin shell of liquid substantially surrounding the person's body covered by the bladder, said shell of liquid providing an external hydrostatic pressure to the portions of the person's body covered by the bladder, and said shell of liquid tensioning the restraint garment layer to provide pressure against the portions of the person's body that are not covered by the liquid shell.

29. The method of claim 28 further comprising providing separate liquid-fillable bootie coverings shaped for placing over the wearer's feet and comprising bootie bladders, and further including the steps of putting the bootie coverings on the wearer's feet, filling the bootie bladders with liquid to form a thin shell of liquid covering the top of the foot and in areas about the ankle and beneath the arch, to provide an external hydrostatic pressure to those covered portions, and placing a booth about each bootie bladder to restrain the bootie bladders when they are filled with liquid to apply hydrostatic pressure to the feet.

30. The method of claim 28 wherein in the step of clothing the person in a liquid-fillable bladder and in filling the bladder with liquid, the step comprises leaving substantially uncovered the area of the person's back that overlies the person's scapulas.

31. The method of claim 28 wherein in the clothing of the person with the liquid-fillable bladder and in filling the bladder with liquid, the bladder and the liquid leave substantially uncovered the upper part of the person's chest above the level of the person's mid-thorax at a level near the person's xiphoid except for a pair of strips extending from the mid-thorax level to the person's neck area, and wherein the portion of the person's back substantially uncovered by the bladder and the liquid further includes the person's upper back and shoulders except for an area approximately underlying the person's spinal column.

32. The acceleration protection ensemble of claim 26, further comprising a liquid containment garment comprising said first layer, and comprising a third layer interior to the second layer, with the cavity located between the first and third layers.

33. The acceleration protection ensemble of claim 32 wherein the first and third layers are connected to each other and the cavity is a single continuous cavity.

34. The acceleration protection ensemble of claim 26 further comprising means for providing liquid flow into and out of the cavity, and means for blocking the liquid flow means to prevent liquid located within the cavity from flowing out of the cavity.

35. The acceleration protection ensemble of claim 26 further comprising a pair of booties, each bootie having means for forming a cavity for containing liquid therein, said bootie cavity forming means comprising liquid impervious material, said cavity forming means of each bootie having a flexible interior layer for pressing against parts of the foot, each said bootie cavity substantially covering the upper surface of the wearer's foot.

36. The acceleration protection ensemble of claim 35 wherein each said cavity for each bootie substantially covers the person's ankle.

37. The acceleration protection ensemble of claim 35 wherein the cavity for each bootie extends beneath the foot in an area about the wearer's arch.

38. The acceleration protection ensemble of claim 35 further comprising means for connecting the body covering cavity with each bootie cavity so that hydrostatic pressure can be transferred through such connection from the body covering cavity to each of the bootie cavities when the said cavities are filled with liquid.

39. The acceleration protection ensemble of claim 38 wherein the means for connecting comprises the interior layer of the body covering cavity covering an upper part of each bootie cavity so that such overlap in coverage allows for transfer of hydrostatic pressure from said first cavity to each bootie cavity.

40. The acceleration protection ensemble of claim 38 wherein the means for connecting comprises connector assemblies that can be connected and disconnected, and wherein when said means for connecting is in the connected position, the body covering cavity and bootie cavities are in liquid flow connection with each other.

41. The acceleration protection ensemble of claim 26, further comprising a reservoir for containing liquid, said reservoir comprising liquid impervious material, said reservoir being in liquid flow connection with the cavity.

42. The acceleration protection ensemble of claim 41 wherein said reservoir is positioned about the person's neck when the ensemble is worn.

43. The acceleration protection ensemble of claim 42, wherein the reservoir has outlet means for allowing liquid to pass out from the reservoir, the said outlet means being separate from the connection of the reservoir with the cavity, and further comprising means for closing the reservoir outlet means.

44. The acceleration protection ensemble of claim 43 wherein the second layer of flexible, indistensible material extends to cover the reservoir.

45. The acceleration protection ensemble of claim 26, further comprising elastic sleeves for fitting snugly about the person's arms.

46. The acceleration protection ensemble of claim 27, further comprising a liquid containment garment comprising said first layer, and comprising a third layer interior to the second layer, with the cavity located between the first and third layers.

47. The acceleration protection ensemble of claim 46 wherein the first and third layers are connected to each other and the cavity is a single continuous cavity.

48. The acceleration protection ensemble of claim 27 further comprising means for providing liquid flow into and out of the cavity, and means for blocking the liquid flow means to prevent liquid located within the cavity from flowing out of the cavity.

49. The acceleration protection ensemble of claim 27 further comprising a pair of booties, each bootie having means for forming a cavity for containing liquid therein, said bootie cavity forming means comprising liquid impervious material, said cavity forming means of each bootie having a flexible interior layer for pressing against parts of the foot, each said bootie cavity substantially covering the upper surface of the wearer's foot.

50. The acceleration protection ensemble of claim 49 wherein each said cavity for each bootie substantially covers the person's ankle.

51. The acceleration protection ensemble of claim 49 wherein the cavity for each bootie extends beneath the foot in an area about the wearer's arch.

52. The acceleration protection ensemble of claim 49 further comprising means for connecting the body covering cavity with each bootie cavity so that hydrostatic pressure can be transferred through such connection from the body covering cavity to each of the bootie cavities when the said cavities are filled with liquid.

53. The acceleration protection ensemble of claim 52 wherein the means for connecting comprises the interior layer of the body covering cavity covering an upper partof each bootie cavity so that such overlap in coverage allows for transfer of hydrostatic pressure from said first cavity to each bootie cavity.

54. The acceleration protection ensemble of claim 52 wherein the means for connecting comprises connector assemblies that can be connected and disconnected, and wherein when said means for connecting is in the connected position, the body covering cavity and bootie cavities are in liquid flow connection with each other.

55. The acceleration protection ensemble of claim 27, further comprising a reservoir for containing liquid, said reservoir comprising liquid impervious material, said reservoir being in liquid flow connection with the cavity.

56. The acceleration protection ensemble of claim 55 wherein said reservoir is positioned about the person's neck when the ensemble is worn.

57. The acceleration protection ensemble of claim 56, wherein the reservoir has outlet means for allowing liquid to pass out from the reservoir, the said outlet means being separate from the connection of the reservoir with the cavity, and further comprising means for closing the reservoir outlet means.

58. The acceleration protection ensemble of claim 57 wherein the second layer of flexible, indistensible material extends to cover the reservoir.

59. The acceleration protection ensemble of claim 27, further comprising elastic sleeves for fitting snugly about the person's arms.

* * * * *